United States Patent [19]
Arita

[11] 3,750,703
[45] Aug. 7, 1973

[54] SELF-SEALING COUPLING ASSEMBLY

[76] Inventor: Teiji Arita, No. 1-21, Nishitobe-cho, Nishi-ku, Yokohama-shi, Kanagawa-ken, Japan

[22] Filed: Aug. 8, 1972

[21] Appl. No.: 278,754

[30] Foreign Application Priority Data
Aug. 9, 1971    Japan.................................. 46/59599

[52] U.S. Cl.............. 137/614.04, 285/24, 137/615
[51] Int. Cl............................ F16l 27/10, F16l 37/00
[58] Field of Search................. 137/615, 616, 616.3, 137/616.5, 614.04, 614.01, 614.02, 614.03, 614.05, 614.06; 285/24

[56] References Cited
UNITED STATES PATENTS

| | | | |
|---|---|---|---|
| 2,451,441 | 10/1948 | Main, Jr..................... | 137/614.03 X |
| 2,456,045 | 12/1948 | Brock ............. | 137/614.03 |
| 3,231,297 | 1/1966 | Watts et al............................ | 285/24 |
| 3,534,984 | 10/1970 | Shuey..................... | 285/24 |
| 3,211,477 | 10/1965 | McCoy............................. | 285/24 X |

*Primary Examiner*—Samuel Scott
*Assistant Examiner*—Ira S. Lazarus
*Attorney*—Bucknam and Archer

[57] ABSTRACT

A self-sealing coupling assembly is disclosed which incorporates a means for absorbing misalignment between the male and female coupling members, said means comprising a resilient member such as of rubber in the form of a bellows having one end connected to a stationary sleeve and the other end to the female coupling member in a manner to support the latter movably in suspension.

2 Claims, 3 Drawing Figures

PATENTED AUG 7 1973

SELF-SEALING COUPLING ASSEMBLY

This invention relates to self-sealing couplings for automatically connecting and disconnecting a fluid transmission line between the source of fluid supply and operating destinations such as rolling mills, vehicle equipment, air-crafts and the like.

Couplings of this type generally consist of a male or feeding unit connected at one end to a source of fluid supply and a female or receiving unit connected at one end to conduits leading to the operating equipment at the distination, both units having interengageable coupling elements at their respective other ends.

There are occasions where these coupling elements are misaligned either lateraly or angularly so that they cannot be engaged with each other. To absorb or otherwise compensate for such misalignment, special machining workmanship has been necessitated to finish the couplings to a maximum precision entailing extremely high manufacturing costs, and rather complicated mechanical or electrical controls have been required to effect a joint of such couplings. A more advanced alignment correction device has involved the use of a coil spring for absorbing misalignment, but this device has suffered from the disadvantages that the spring is subjected to corrosion in contact with corrosive fluids and that the device is necessarily large in size.

Whereas, it is the primary object of the present invention to eliminate the above-noted difficulties encountered with conventional self-sealing couplings.

It is a more specific object of the invention to provide an improved self-sealing coupling assembly for fluid pressure lines which is simple in construction and highly reliable in operation.

It is another specific object of the invention to provide an improved self-sealing coupling assembly having means for correcting misalignment of the male and female coupling elements occurring in any direction and in large magnitudes that have not been effectively absorbed by prior-art devices.

These and other objects and features of the invention will be better understood from the following description taken in conjunction with the accompanying drawings in which.

Figure 1:
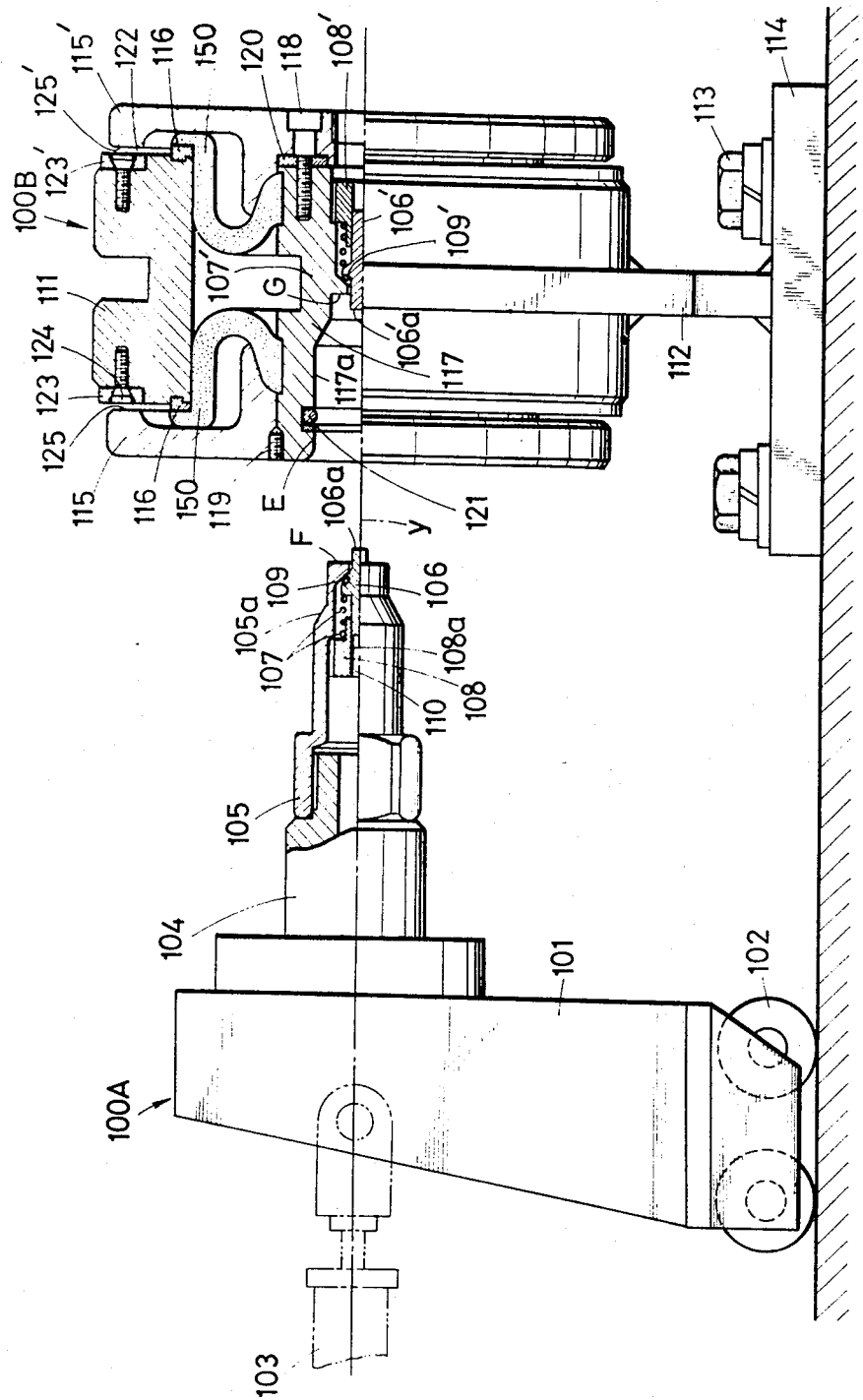
FIG. 1 is a partially sectional side elevation of a coupling assembly embodying the invention.

Referring now to the drawings and FIG. 1 in particular, there is shown a coupling assembly which consists of a male or feeding unit 100A and a female or receiving unit 100B interengageable therewith. The male or feeding unit 100A comprises a movable block 101 having wheels 102 and connected at one end to a hydraulic or air cylinder 103 adapted to drive or move the block 101 towards and away from the female unit, and a male coupling holder 104 extending horizontally from the other end of the block 101 and having mounted thereon a male coupling member 105. A valve means 106 for opening and closing the passage of a fluid is mounted in the interior of and operatively associated with the coupling member 105. This valve means 106, preferably in the form of a poppet valve as shown, is loaded with a helically coiled compression spring 107 interposed between its inner wall and a spring seat 108.

The valve 106 is thus normally urged by this spring towards an O-sealing ring 109 provided in the fluid passage to close the same.

The valve 106 is provided with a round operating tip 106a which is disposed for abutting engagement with corresponding portion of a valve means in a female coupling member later described. The spring seat 108 has an inner surface 108a disposed for sliding engagement with the valve 106 as the latter is retracted through a clearance 110 against the tension of the spring 107.

Figure 3:
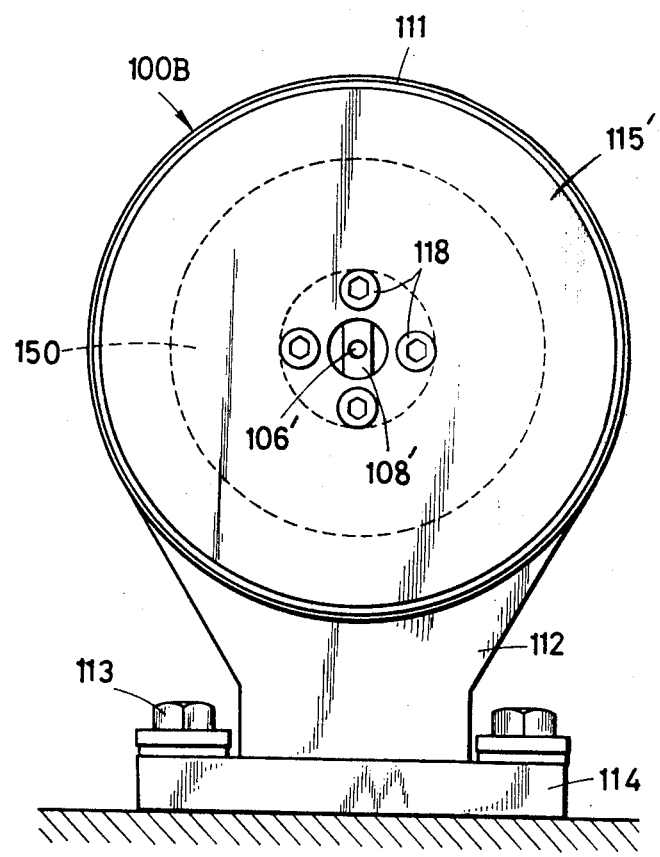
FIG. 3 is a front elevation of the female unit of the coupling assembly shown in FIG. 1 and 2.

Now, the female or receiving unit 100B is shown as being held stationary relative to the mobile male unit 100A, although the arrangement may be vice versa depending upon operating environments and design choice. The female or receiving unit 100B is substantially in the form of a drum, as better seen in FIG. 3, and essentially comprises a circumferential stationary sleeve 111 which is supported by a frame member 112 secured by bolts 113 to a floor bed 114, and circular movable flange members 115, 115' moveably connected to opposite sides of the sleeve 111. Designated at 150 is a misalignment absorption or alignment correction means which constitutes an important aspect of the invention, which means comprises a resilient support member made of elastic materials such as rubber having one peripheral end secured by means of a steel ring 116 to the stationary sleeve 111. The other peripheral end of the resilient member 150 is connected to a female coupling member 117 which is in turn secured by bolts 118 and 119 to the respective side flange members 115, 115'. With this arrangement, the female coupling member 117 is hung in suspension and allowed to move radially in any direction through the agency of the resilient support member 150 in response to the impacts that take place when it is misaligned with the male coupling 105. The resilient support member 150 is flexed radially inwardly substantially into a bellows form providing a cushioning effect to absorb such misalignment of the female coupling member 117 which is represented by the radial movement thereof.

The female coupling member 117 has an operating surface contour 117a configured to register with the mating contour 105a of the male coupling member 105, and is provided with a spring-loaded valve means 106' substantially identical in construction and function to the poppet valve 106 of the male coupling. The spring constant of the compression spring 107 in the male coupling 105 is the same as that of the compression spring 107' in the female coupling 117, so that the two valves 106 and 106' are held in centered equilibrium relation to each other when the male and female couplings are fully engaged to communicate the fluid passage therebetween. Designated at 120 is a packing to seal against leakage of the fluid, and at 121 is an O-sealing ring to prevent leakage which may take place during and before the joint is effected between the male and female couplings 106, 106'.

Figure 2:
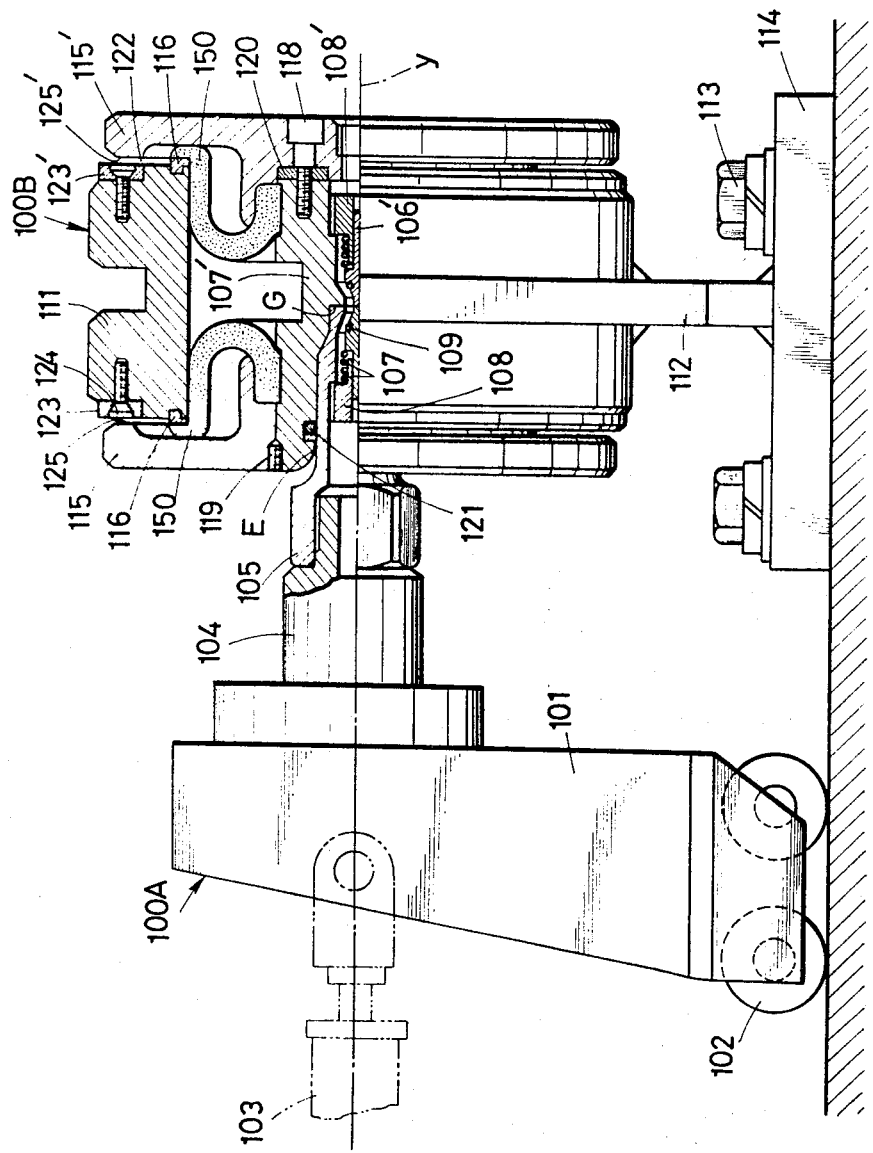
FIG. 2 is a view similar to FIG. 1 but showing the assembly in coupled disposition.

With this construction, the male unit 100A is moved towards the female unit 100B to bring the male coupling 105 progressively into engagement with the female coupling 117. Assuming that there is a misalignment in the center axis (y) between the male and female couplings 105 and 117, the shoulder portion D of the male coupling abuts against a rounded marginal portion E of the female coupling and moves the flanges 115, 115' radially inwardly for a distance corresponding to the amount of misalignment or axial displacement. With the two mating couplings thus aligned, the male coupling 105 is further advanced until the operating tip 106a of the valve 106 abuts against the tip 106'a of the valve 106' in the female coupling. These opposed valves 106, 106' are thus pressed against each other and retracted progressively against the tension of their respective springs 107, 107' until the interengaging surface contours 105a and 117a are snugly fitted together with vertical abutment F of the male coupling stopped in contact with the corresponding abutment G of the female coupling, thereby effecting a joint between the male and female couplings 115, 117 as shown in FIG. 2.

Retracting the male unit 100A separates or disconnects between the male and female couplings 105, 117, with their respective valves 106, 106' restoring their normally closed condition under the influence of the compression springs 107, 107' as shown in FIG. 1.

To permit the flanges 115, 115' to move relative to the stationary sleeve 111, there is provided a minute clearance 122 defined circumferentially therebetween. Alternatively, the stationary sleeve 111 may be provided with Teflon-ring members 123, 123' secured by bolts 124 around its peripheral surfaces for sliding contact with the inner peripheral surfaces 125, 125' of the flanges 115, 115'.

Having thus described the invention, it is to be understood that various changes and modifications may be made in the specific form and construction illustrated, without departing from the scope of the appended claims.

What is claimed is:

1. A self-sealing coupling assembly comprising a reciprocally movable fluid feeding unit and a stationary fluid receiving unit operatively associated therewith, said feeding unit including a coupling holder, a male coupling member mounted therein and a spring-loaded valve operatively associated with said male coupling member to open and close a fluid passage, and said receiving unit being in the form of a drum comprising a stationary circumferential sleeve, side flanges radially movable relative thereto, a female coupling member secured to said flanges a spring-loaded valve operatively associated therewith and a resilient support means connected at one end to said female coupling member and at the other end to said stationary sleeve so that said female coupling member is supported resiliently in suspension and radially movable together with said side flanges in response to and to absorb misalignment thereof with said male coupling member.

2. The self-sealing coupling assembly of claim 1 wherein said resilient support means is made of rubber in the form of a bellows.

* * * * *

UNITED STATES PATENT OFFICE
CERTIFICATE OF CORRECTION

Patent No. 3,750,703     Dated August 7, 1973

Inventor(s) TEIJI ARITA

It is certified that error appears in the above-identified patent and that said Letters Patent are hereby corrected as shown below:

On the cover sheet, insert -- [73] -- Assignee:

The Yokohama Rubber Co., Ltd., Tokyo, Japan, a corporation of Japan --.

Signed and sealed the 6th day of August 1974.

(SEAL)
Attest:

McCOY M. GIBSON, JR.            C. MARSHALL DANN
Attesting Officer                Commissioner of Patents